US007598948B1

(12) United States Patent
Priem

(10) Patent No.: US 7,598,948 B1
(45) Date of Patent: Oct. 6, 2009

(54) SYSTEM AND METHOD OF DETECTING ROTATED DISPLAYS

(75) Inventor: Curtis Priem, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 695 days.

(21) Appl. No.: 10/772,195

(22) Filed: Feb. 3, 2004
(Under 37 CFR 1.47)

Related U.S. Application Data

(60) Provisional application No. 60/445,591, filed on Feb. 6, 2003.

(51) Int. Cl.
*G06T 15/00* (2006.01)

(52) U.S. Cl. ........................ 345/204; 345/619; 710/107

(58) Field of Classification Search ................. 345/204, 345/419, 619, 649, 650; 710/107
See application file for complete search history.

(56) References Cited

U.S. PATENT DOCUMENTS 4,914,605 A * 4/1990 Loughmiller et al. ....... 345/649
5,369,735 A * 11/1994 Thier et al. ................. 345/423
RE37,944 E * 12/2002 Fielder et al. ............... 345/519

OTHER PUBLICATIONS

"The I$^2$C-bus and how to use it (including specification)"; 1992, *Philips Semiconductors Video Products*, pp. 2-163 thru 2-203.
VESA; "VESA Enhanced Extended Display Identification Data Standard"; 2000, *Video Electronics Standards Association*, Release A, Rev. 1, pp. 1-32.
VESA; "VESA Enhanced Display Data Channel Standard"; 1999, *Video Electronics Standards Association*, Version 1, pp. 1-21.
VESA; "Display Data Channel Standard"; 1996, *Video Electronics Standards Association*, Version 2, Release 0, pp. 1-35.
VESA; "Extended Display Identification Data Standard"; 1997, *Video Electronics Standards Association*, Version 3, pp. 1-80.
VESA; "VESA BIOS Extensions/Display Data Channel Standard"; 1999, *Video Electronics Standards Association*, Version 1.1, 9 pages.

* cited by examiner

*Primary Examiner*—Phu K Nguyen
(74) *Attorney, Agent, or Firm*—Townsend and Townsend and Crew LLP

(57) ABSTRACT

A system for adjusting display data orientation. The system includes graphics circuitry to send and receive control signals over a set of control lines. The exchange of control signals is governed by a communication protocol. The graphics circuitry is configured to request orientation information via the set of control lines upon detecting a modulation of the set of control lines that is undefined by or illegal under the communication protocol. Based on the orientation information received in response to the request, the graphics circuitry adjusts the orientation of display data transmitted by the graphics circuitry.

35 Claims, 8 Drawing Sheets

SYSTEM AND METHOD OF DETECTING ROTATED DISPLAYS

BACKGROUND OF THE INVENTION

The present invention relates generally to detecting a rotation, and other state changes, of a display, and particularly to adjusting an image displayed by the display. The prior art includes displays that rotate. Typically, user intervention and/or dedicated signal lines are required to respond to the rotation of a display. For example, if a user rotates a display, the user may also be required to manually notify the source of imagery displayed by the display (e.g., a computer) about the rotation. In some prior art systems, manually notifying the source of the imagery may include pressing one or more keys of a keyboard connected to the source. Upon detecting this action, the source may rotate the imagery to match the rotation of the display. In still other prior art systems, the display detects rotations and notifies the source without user intervention, but uses dedicated lines connected to the source to notify the source about display rotations.

What is needed in the art, therefore, is a system and method for detecting display rotations and notifying the source of imagery displayed by the display about the display rotations that does not require a set of dedicated lines.

BRIEF SUMMARY OF THE INVENTION

A system for adjusting display data orientation. The system includes graphics circuitry to send and receive control signals over a set of control lines. The exchange of control signals is governed by a communication protocol. The graphics circuitry is configured to request orientation information via the set of control lines upon detecting a modulation of the set of control lines that is undefined by or illegal under the communication protocol. Based on the orientation information received in response to the request, the graphics circuitry adjusts the orientation of display data transmitted by the graphics circuitry.

A system for processing orientation changes. The system includes a display device configured to communicate over a set of control lines in accordance with a communication protocol. The display device is further configured to detect changes to its orientation. The display device is also configured to initiate a modulation of the set of control lines that is undefined by or illegal under the communication protocol upon making such a detection.

A system for processing display device orientation changes. This system includes a display device and graphics circuitry. These two devices are configured to exchange control signals over a set of control lines in accordance with a communication protocol. The display device is further configured to detect a change in its orientation. In response to such a detection, the display device is configured to initiate a modulation of the set of control lines that is undefined by or illegal under the communication protocol. The graphics circuitry is further configured to request orientation information from the display device upon detecting the modulation of the set of control lines. Finally, the graphics circuitry is configured to adjust the orientation of display data transmitted to the display device by reference to the orientation information received from the display device via the set of control lines.

A system for adjusting display data orientation. The system includes graphics circuitry to send and receive control signals over a set of control lines. The exchange of control signals is governed by a master/slave communication protocol under which the graphics circuitry is a lone master of the set of control lines. The graphics circuitry is configured to request orientation information via the set of control lines upon detecting a modulation of the set of control lines that is undefined by the master/slave communication protocol and not initiated by the graphics circuitry. Based on the orientation information received in response to the request, the graphics circuitry adjusts the orientation of display data transmitted by the graphics circuitry. A system for processing orientation changes. The system includes a display device configured to communicate over a set of control lines in accordance with a master/slave communication protocol under which the display device is a slave. The display device is further configured to detect changes to its orientation. The display device is also configured to initiate a modulation of the set of control lines in violation of master/slave communication protocol upon making such a detection.

A system for processing display device orientation changes. The system includes a display device and graphics circuitry that are configured to exchange control signals over a set of control lines. The exchange is governed by a master/slave communication protocol under which the graphics circuitry is a lone master of the set of control lines and the display device is a slave of the set of control lines. The display device is further configured to detect a change in its orientation. The display device is further configured to initiate a modulation of the set of control lines in violation of the master/slave communication protocol upon detecting the change in its orientation. The graphics circuitry is further configured to request orientation information from the display device upon detecting the modulation of the set of control lines. Finally, the graphics circuitry is configured to adjust an orientation of display data transmitted to the display device by reference to the orientation information received via the set of control lines in response to the request.

A communication channel comprising a data signal and a clock signal. A start condition is indicated on the communication channel by a high-to-low transition of the data signal followed by a high-to-low transition of the clock signal. A stop condition is indicated on the communication channel by a low-to-high transition of the clock signal followed by a low-to-high transition of the data signal. A bit value of one is indicated on the communication channel by the data signal being high while the clock signal has a low-to-high transition followed by a high-to-low transition. A bit value of zero is indicated on the communication channel by the data signal being low while the clock signal has a low-to-high transition followed by a high-to-low transition. And a state change in a slave of the communication channel is indicated on the communication channel by a pulse of the data signal while the clock signal is unchanged.

A communication channel consisting of a serial data line (SDA) and a serial clock line (SCL). A start condition is indicated on the communication channel by a high-to-low transition on the SDA followed by a high-to-low transition on the SCL. A stop condition is indicated on the communication channel by a low-to-high transition on the SCL followed by a low-to-high transition on the SDA. A bit value of one is indicated on the communication channel by the SDA being high while the SCL has a low-to-high transition followed by a high-to-low transition. A bit value of zero is indicated on the communication channel by the SDA being low while the SCL has a low-to-high transition followed by a high-to-low transition. And a state change in a slave of the communication channel is indicated on the communication channel by a pulse on the SDA while the SCL is unchanged.

A communication channel between a master device and a slave device that includes an $I^2C$ bus with a serial data line (SDA) and a serial clock line (SCL). The slave device is configured to indicate a monitor rotation to the master device by changing a state on the SDA while the SCL is in a high state.

A communication channel between a master device and a slave device that includes an $I^2C$ bus with a serial data line (SDA) and a serial clock line (SCL). The slave device is configured to indicate a state change of the slave device to the master device by changing a state on the SDA while the SCL is in a high state.

A protocol for use with a two-line serial bus that includes a start condition; a stop condition; a bit with a value of one; a bit with a value of zero; and a state change condition indicating to a master device connected to the serial bus a changed state of a slave device connected to the serial bus.

A computer system comprising a graphics circuit, a display, and a serial bus. The graphics circuit is configured to generate display data and the display configured to display the display data. Further, the display and the graphics circuit are coupled via the serial bus, which comprises a serial data line and a serial clock line, to exchange control signals. The control signals include a start condition, which is indicated by a high-to-low transition on the serial data line followed by a high-to-low transition on the serial clock line, a stop condition, which is indicated by a low-to-high transition on the serial clock line followed by a low-to-high transition on the serial data line, a bit value of one, which is indicated by the serial data line being high while the serial clock line has a low-to-high transition followed by a high-to-low transition, a bit value of zero, which is indicated by the serial data line being low while the serial clock line has a low-to-high transition followed by a high-to-low transition, and a state change in the display, which is indicated by the display with a pulse on the serial data line while the serial clock line is unchanged.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE INVENTION

Figure 1A:
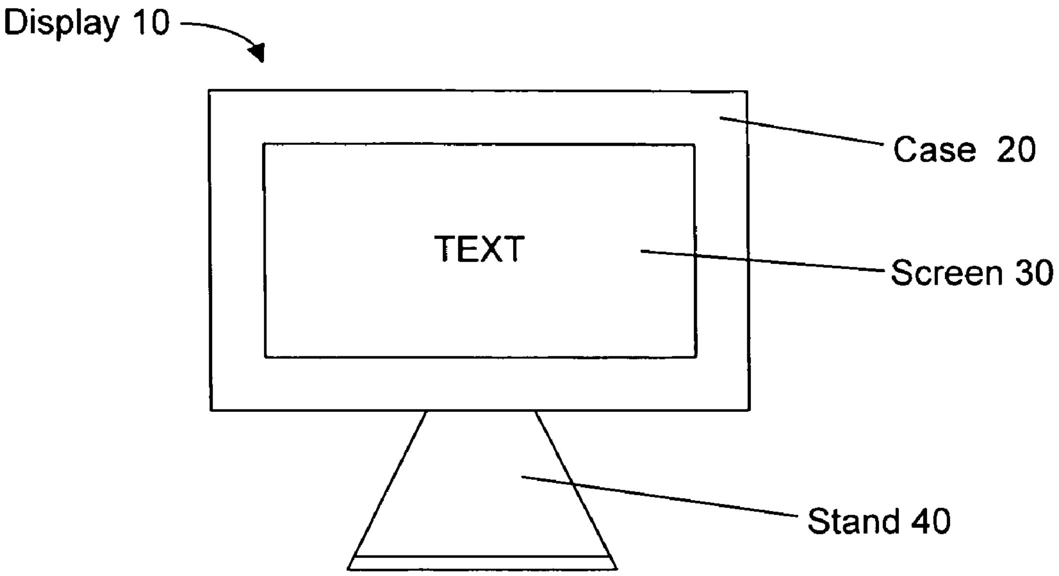
FIG. 1A illustrates a frontal view of a display and displayed text in a landscape orientation.

Referring to FIG. 1A, there is shown a frontal view of a display 10. Visible components of the display 10 include a case 20, a screen 30, and a stand 40. The case 20 and/or stand 40 typically house a plurality of electronic and optical components (excluding the screen 30) that are not visible in FIG. 1A but enable the display 10 to receive and display data 85 (FIG. 1H) (e.g., digital or analog imagery). Some of these components are described below in connection with FIG. 2. The screen 30 may be, for example, a cathode ray tube ("CRT") or a flat-panel, which may use plasma technology or liquid crystal technology (e.g., a passive matrix liquid crystal display ("LCD"), an active matrix LCD, or a ferroelectric LCD). Other types of displays 10 are possible and within the scope of the present invention.

Figure 1B:
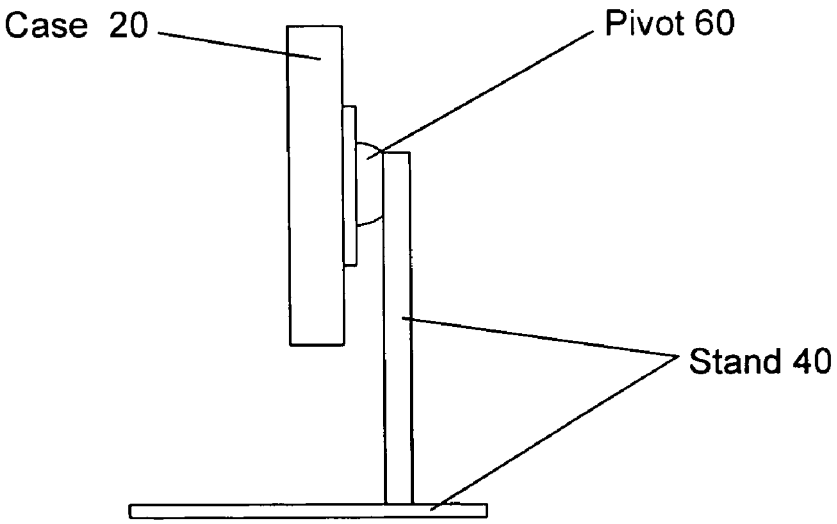
FIG. 1B illustrates a side view of a display.

FIG. 1B illustrates the display from a side view. From this view, the screen 30 is no longer visible, but a pivot 60, which allows the screen 30 and case 20 to rotate within a plane of the visible portion of the screen 30, is now visible. The pivot 60 enables a user to rotate the case 20 and screen 30 (i.e., the display 10) between, for example, a portrait orientation and a landscape orientation.

The display 10 preferably incorporates an orientation sensor that detects the orientation of the display 10 and when it changes. A wide variety of technologies may be used for this purpose without departing from the scope of the present invention. Preferably, when the case 20 and screen 30 are rotated to a new orientation, the orientation sensor preferably communicates the orientation of the display 10 to circuitry, which is described below in connection with FIG. 2, within the display 10. Generally, the user grasps the case 20 and rotates the screen. Optionally, the rotation can be done with a motor. For example, the orientation sensor may include one or more of the following components known in the art: a mercury switch; a mechanical switch; an optical encoder; an optical detector; or a shaft encoder. Other components are possible, and within the scope of the present invention. The various switches and sensors can be read with general purpose input/output circuits that are in communication with a controller within the display 10.

With respect to the screen 30, a landscape orientation is one in which the length of the screen 30 along a vertical axis is shorter than the length of the screen 30 along a horizontal axis. Assuming that the display data 85 fills the entire screen 30, a landscape orientation, with respect to display data 85, is one in which the length of the display data 85 along an axis running from the top of the display data 85 to the bottom of the display data 85 is shorter than the length of the display data 85 along an axis running from one side of the display data 85 to another side of the display data 85. With respect to the screen 30, a portrait orientation is one in which the length of the screen 30 along a horizontal axis is shorter than the length of the screen 30 along a vertical axis. And with respect to display data 85, a portrait orientation is one in which the length of display data 85 along an axis running from one side of the display data 85 to another side of the display data 85 is shorter than the length of the display data 85 along an axis running from top of the display data 85 to the bottom of the display data 85.

Figure 1C:
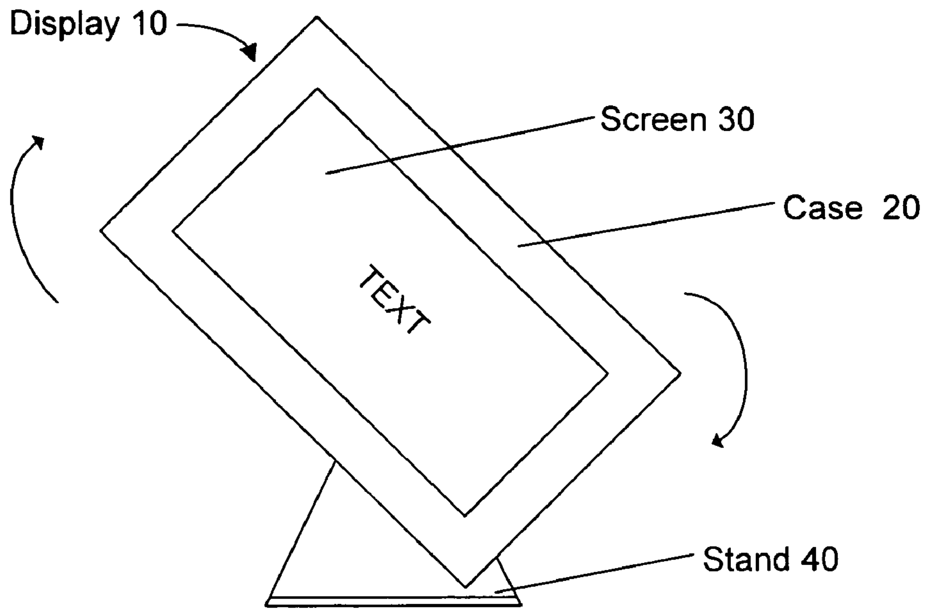
FIG. 1C illustrates a frontal view of a display and displayed text being rotated from a landscape orientation.

Referring again to FIG. 1A, the display 10 and the display data 85 (e.g., the word "TEXT") are in a landscape orientation. FIG. 1C shows the case 20 and the screen 30 being rotated clockwise from the landscape orientation to a portrait orientation. Typically, a user manually rotates the display, but automated technology may be used as well without departing from the scope of the present invention.

Figure 1D:
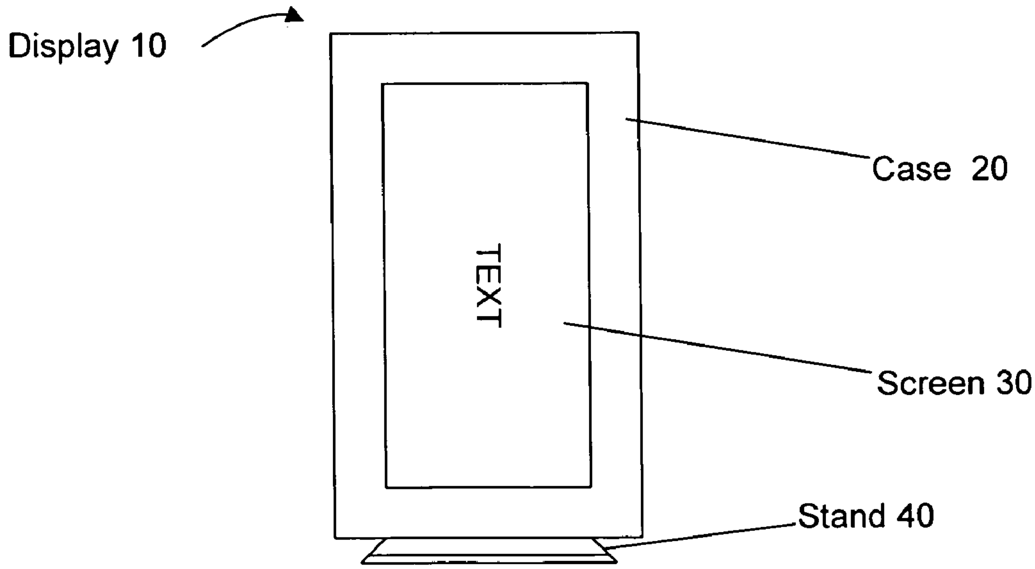
FIG. 1D illustrates a frontal view of a display in a portrait position and displayed text in a landscape orientation.
Figure 1E:
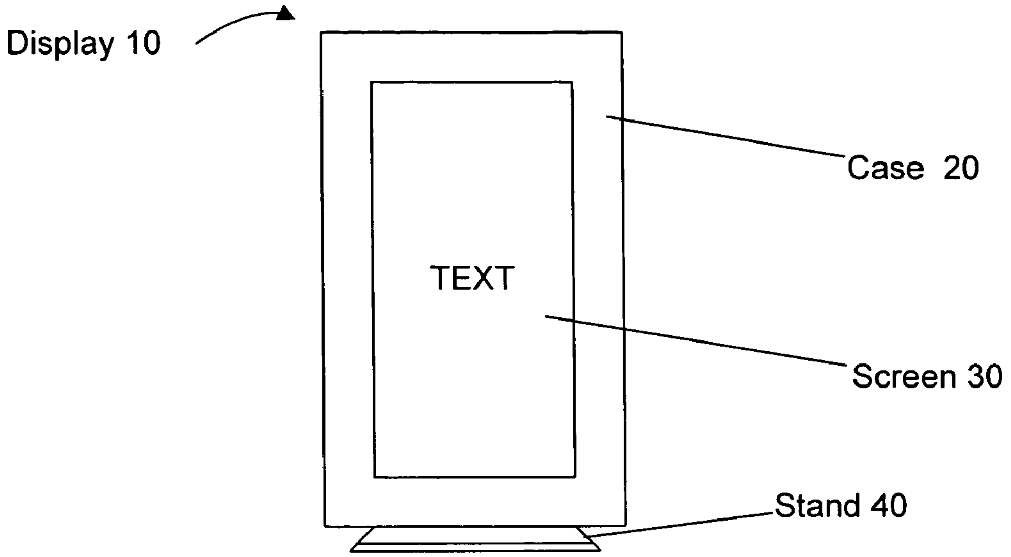
FIG. 1E illustrates a frontal view of a display and displayed text in a portrait orientation.

Following a rotation of, for example, approximately 90 degrees, the display 10 is in a portrait orientation but the display data 85 initially remains in a landscape orientation as illustrated in FIG. 1D. The orientation of the display data 85 has not been changed by a source of the display data 85. As a result, the display data 85 is "sideways" as indicated by the orientation of the word "TEXT." FIG. 1E illustrates the display data 85 and the display 10 following an adjustment to the orientation of the display data 85. Both the display data 85 and the display 10 are in a portrait orientation.

Figure 1F:
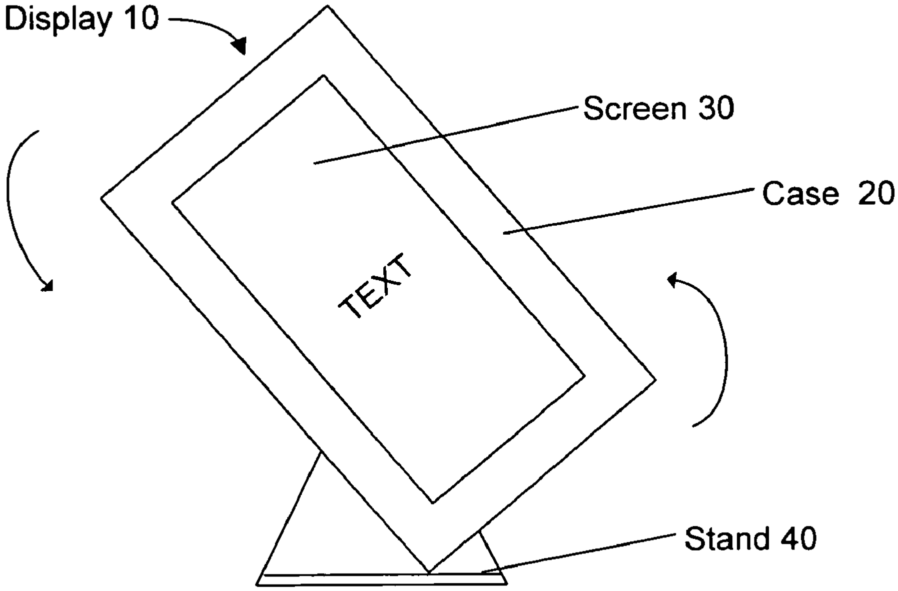
FIG. 1F illustrates a frontal view of a display and displayed text being rotated from a portrait orientation.
Figure 1G:
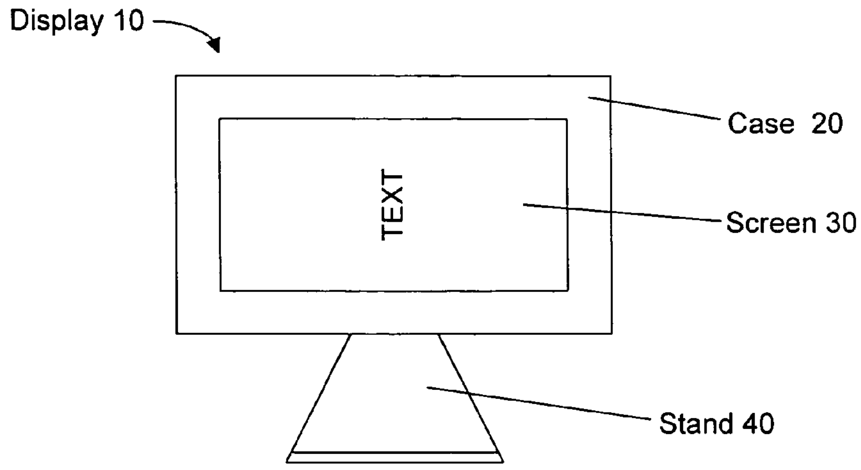
FIG. 1G illustrates a frontal view of a display in a landscape position and displayed text in a portrait orientation.

FIG. 1F shows the case 20 and the screen 30 being rotated counter-clockwise from the portrait orientation to a landscape orientation. Following a rotation of approximately 90 degrees, the display 10 is in a landscape orientation but the display data 85 (e.g., the word "TEXT") remains in a portrait orientation as illustrated in FIG. 1G. Following another adjustment to the orientation of the display data 85, both the display data 85 and the display 10 are in a landscape orientation as illustrated in FIG. 1A.

Figure 1H:
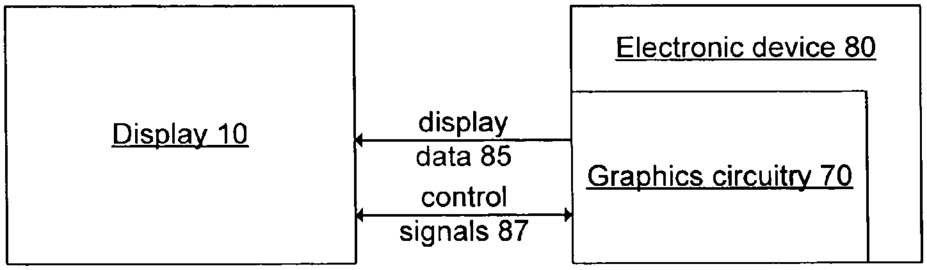
FIG. 1H is a block diagram of a display connected to graphics circuitry mounted within an electronic device.

As indicated above, the display 10 is typically not a source of the display data 85. FIG. 1H illustrates a block diagram of the display 10, graphics circuitry 70, and an electronic device 80 such as a computer. The graphics circuitry 70 and/or the electronic device 80 generate the display data 85, which as illustrated in FIG. 1H is transmitted from the graphics circuitry 70 to the display 10.

The graphics circuitry 70 is typically responsible for formatting the display data 85 so that its orientation matches that of the display 10. The display data 85 can take the form of analog signals or digital signals. In some embodiments, the display data 85 corresponds to an array of pixels that may represent, for example, a "desktop" of a computer. The graphics circuitry 70, in some embodiments, includes capacity for 3D graphics processing such that the array of pixels represents 3D animated graphics. Further, the array of pixels could be 1600 pixels horizontally and 1200 vertically (i.e., a "portrait" display) or 1200 pixels horizontally and 1600 vertically (i.e., a "landscape" display). The size of the array of pixels is generally controlled by registers within the graphics circuitry 70, with the register values set by software (typically, driver software).

Also transmitted back and forth between the display 10 and the graphics circuitry 70 are control signals (e.g., a clock signal and a data signal) 87. These control signals 87 enable the graphics circuitry 70 and the electronic device 80 to, among other things, transmit and respond to requests for data. For example, when the orientation of the display 10 is changed (e.g., from landscape to portrait), the display 10 notifies the graphics circuitry 70 via the control signals 87 as described in detail below.

Figure 2:
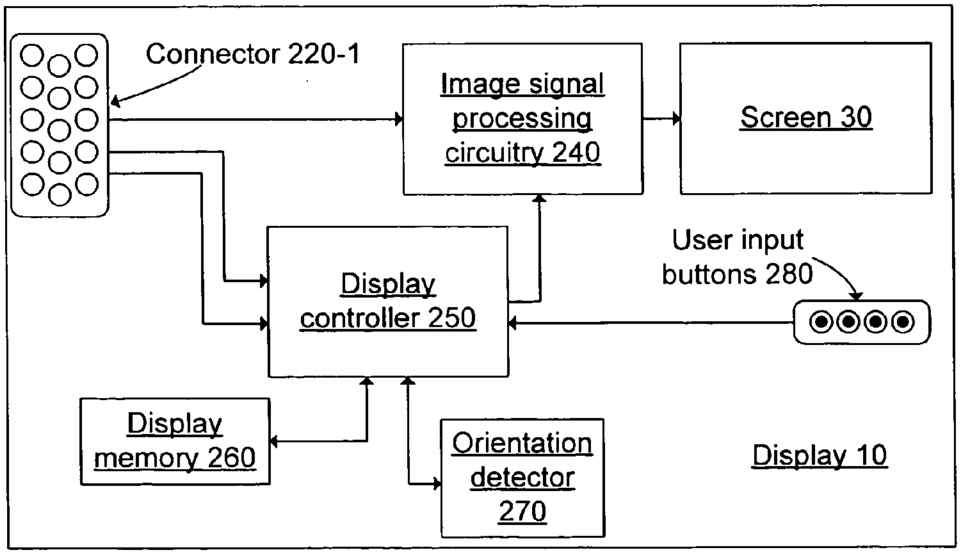
FIG. 2 is a block diagram of display components consistent with an embodiment of the present invention.

Referring to FIG. 2, there is shown a block diagram of components that may be included in the display 10. Preferably, these components include a connector 220-1, display data processing circuitry 240, a display controller 250, display memory 260, an orientation detector 270, and user input buttons 280. Other components may be included in the display 10 without departing from the scope of the present invention.

In a preferred embodiment, a connector 220 is consistent with a mechanical video graphics array ("VGA") connector. As illustrated in FIG. 2, the preferred connector 220 includes pins (for a male connector) or sockets (for a female connector) to exchange electrical signals (e.g., control signals 87, display data 85, power, ground, etc.) with the graphics circuitry 70. Different types of connectors 220 (e.g., Digital Visual Interface connectors, Enhanced Video Connectors, Plug and Display connectors, Digital Flat Panel connectors, Low Voltage Differential Signaling Digital Interface connectors, etc.) may be used without departing from the scope of the present invention. Typically, the connector 220 provides the only means for electrically and mechanically connecting the display 10 to the graphics circuitry 70. Table 1 illustrates a preferred pin-out of the connector 220. Hereinafter, the pin description of Table 1 is assumed, but the invention can be applied to any other configuration of pins and/or signal connections.

TABLE 1

| | |
|---|---|
| Pin/Skt 1 | Red video |
| Pin/Skt 2 | Green video |
| Pin/Skt 3 | Blue video |
| Pin/Skt 4 | Monitor ID bit 2 |
| Pin/Skt 5 | Return |
| Pin/Skt 6 | Red video return |
| Pin/Skt 7 | Green video return |
| Pin/Skt 8 | Blue video return |
| Pin/Skt 9 | +5 volt supply |
| Pin/Skt 10 | Synchronization return |
| Pin/Skt 11 | Monitor ID bit 0 |
| Pin/Skt 12 | Data signal |
| Pin/Skt 13 | Horizontal synchronization |
| Pin/Skt 14 | Vertical synchronization |
| Pin/Skt 15 | Clock signal |

Most of the pins included in Table 1 are used to transmit display data 85 and signals 87 that control how the display data 85 is displayed. In prior art systems, the function of these signals is well known. In order to keep the total number of wires connecting the display 10 and the graphics circuitry 70 to a minimum (as shown in the example of Table 1), such systems employ a two-wire interface (e.g., a serial clock line and a serial data line) or a communication channel for transmission of a subset of the control signals 87 (i.e., a clock signal and a data signal). The data signal and the clock signal enable communication between the display 10 and the graphics circuitry 70 and/or the electronic device 80 that is compliant with the Display Data Channel 2B ("DDC2B") standard (the specification of which is incorporated herein by reference). As described in the DDC2B standard or specification, defined and/or legal states or transmissions of or through the two-wire interface, serial clock and data lines, or the communication channel include start conditions, stop conditions, bit values of one, and bit values of zero.

Further, the data signal is defined by the DDC2B standard as being bi-directional, which means that the graphics circuitry 70 and the display 10 can transmit and receive a data signal (e.g., modulate the state of their respective data signal Pin/Skt 12). The clock signal, however, is defined by the DDC2B standard as being unidirectional such that only the graphics circuitry 70 can transmit a clock signal (e.g., modulate the state of it's clock signal Pin/Skt 15).

There are, however, differences between the function or use of pins/sockets Pin/Skt 12 and Pin/Skt 15, which transmit the data signal and the clock signal, respectively, in the present invention and in prior art systems. Briefly, the present invention includes a modulation of the data signal and/or the clock signal that is inconsistent with start conditions, stop conditions, bit values of one, and bit values of zero (or otherwise undefined or disallowed by the DDC2B standard).

Returning to FIG. 2, specific components (not illustrated) that manipulate or monitor the state of the data signal Pin/Skt 12 and possibly the clock signal Pin/Skt 15 of the display's 10 connector 220 may include pull-up resistors, input buffers, transistors, tri-state drivers, open collector drivers, and/or other components without departing from the scope of the present invention.

Some computer systems are "multi-headed" in that they have two or more monitors. In such systems, the clock and data signal is generally separate for the two monitors. That is, each monitor corresponds to a pair of data/clock signals. It is possible for multiple monitors to share the same data/clock signals. Hereinafter, only single monitor systems will be described, but the invention can be applied to multi-monitor systems.

The display data processing circuitry 240 may be dependant upon the type of the display 10. For example, the display data processing circuitry 240 may include a preamplifier, a CRT driver, deflection circuitry, on-screen display circuitry, etc. when the display 10 receives and displays display data 85 in an analog form.

The user input buttons 280 are typically used in conjunction with the on-screen display circuitry to, for example, adjust the size and position of display data 85 on the screen 30 and the brightness, contrast, and color settings of the screen 30. The onscreen display circuitry may, for example, display the size and position of display data 85 on the screen 30 and the brightness, contrast, and color settings of the screen 30 while these attributes are adjusted via the user input buttons 280.

The display data processing circuitry 240 receives input (e.g., R/GB display data signals) from the connector 220-1 and input (e.g., a horizontal synchronization signal, a vertical synchronization signal, control signals 87, etc.) from the controller 250. The output of the display data processing circuitry 240 to the screen 30 is typically display data 85 and control signals 87.

The display controller 250 controls the operation of the display data processing circuitry 240, responds to manipulation of the user input buttons 280, and communicates with the graphics circuitry 70 and/or the electronic device 80. The display controller 250 may receive as input from the connector 220-1 a horizontal synchronization signal and a vertical synchronization signal, which control how the display data 85 is displayed, and a data signal and a clock signal, which together enable communication that adheres to the DDC2B standard.

The display memory 260, which may be incorporated in the display controller 250, stores information such as settings of the display 10 (e.g., the size and position of display data 85 on the screen 30 and the brightness, contrast, and color settings of the screen 30) and other data as described in detail below.

The display 10 includes a data interface to an orientation detector 270. In preferred embodiments, the orientation of the display 10 is in one of two orientations—landscape or portrait. If the display 10 is in a landscape orientation, the orientation detector 270 may, for example, adjust this data interface to a logic HIGH state. Conversely, if the display 10 is in a portrait orientation, the orientation detector 270 may, for example, adjust this data interface to a logic LOW state. When such action is taken, the display controller 250 may adjust related data maintained in the display memory 260 accordingly and signal the graphics circuitry 70 as described below.

Figure 3:
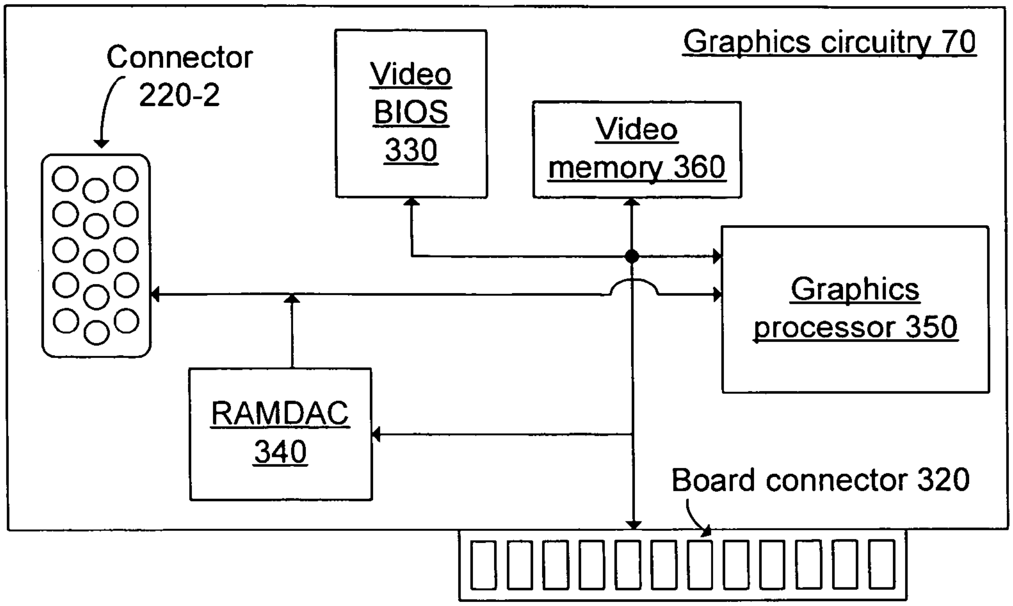
FIG. 3 is a block diagram of graphics circuitry consistent with an embodiment of the present invention.

Referring to FIG. 3, there is shown a block diagram of components that may be included in the graphics circuitry 70. Specifically, these components include a connector 220-2, a board connector 320, video BIOS 330, RAMDAC 340, a graphics processor 350, and video memory 360.

The board connector 320 provides a means for mechanically and electrically connecting the graphics circuitry 70 to the electronic device 80. More specifically, a board connector 320 may secure the graphics circuitry 70 to the electronic device 80 and enables the graphics circuitry 70 and the electronic device 80 to exchange a plurality of separate electrical signals. The board connector 302 may be Peripheral Component Interconnect ("PCI") compliant, Accelerated Graphics Port ("AGP") compliant, which enables the graphics circuitry 70 to directly access the memory 460 (FIG. 4) of the electronic device 80, or compliant with another standard. Alternatively, the graphics circuitry can take the form of an integrated circuit on a computer motherboard.

In some embodiments, the graphics circuitry 70, as FIG. 3 suggests, is incorporated on a "card" that removably plugs into the electronic device 80 via the board connector 320. In these embodiments, a board connector 320, or other connector, is generally required. In other embodiments, however, the graphics circuitry 70 is built into the electronic device 80. For example, in embodiments in which the electronic device 80 is a computer, the graphics circuitry 70 may be mounted with components such as central processing units 450 (FIG. 4) on a motherboard. In still other embodiments, the graphics circuitry 70 is incorporated on a card that is non-removably affixed to the electronic device 70. In either of these last sets of embodiments, the graphics circuitry 70 may communicate with the electronic device 80 via signal traces or other means and not use and/or include a board connector 320.

The video BIOS 330 may be a read only memory ("ROM") chip that includes operational firmware, graphics mode definitions, and screen fonts. The video BIOS 330 may also control how other components in the graphics circuitry 70 interact and perform diagnostic tests on the video memory 360 and I/O of the graphics circuitry 70.

The RAMDAC 340, which may be integrated into the graphics processor 350, converts digital display data 85 generated by the electronic device 80 and/or the graphics circuitry 70 to an analog signal for the display 10. For example, the RAMDAC 340 may read contents of the video memory 360 and convert it to analog R/GB signals that are sent to the display 10 through the connector 220. If the display data 85 is analog, the graphics circuitry generally includes a DAC of some type.

In some embodiments of the present invention, display data 85 is also (or instead) transmitted in a digital form to the display 10. In these embodiments of the invention, contents of the video memory 360 may be transmitted to the display 10 without the assistance of the RAMDAC (e.g., in addition to the converted contents of the video memory 360). In these embodiments, two or more connectors 220, one of which supports the transmission of display data 85 in a digital form, may be included in the graphics circuitry 70. And in some embodiments, a RAMDAC 340 is not included such that the display data 85 is transmitted to the display 10 in a digital form only.

Figure 4:
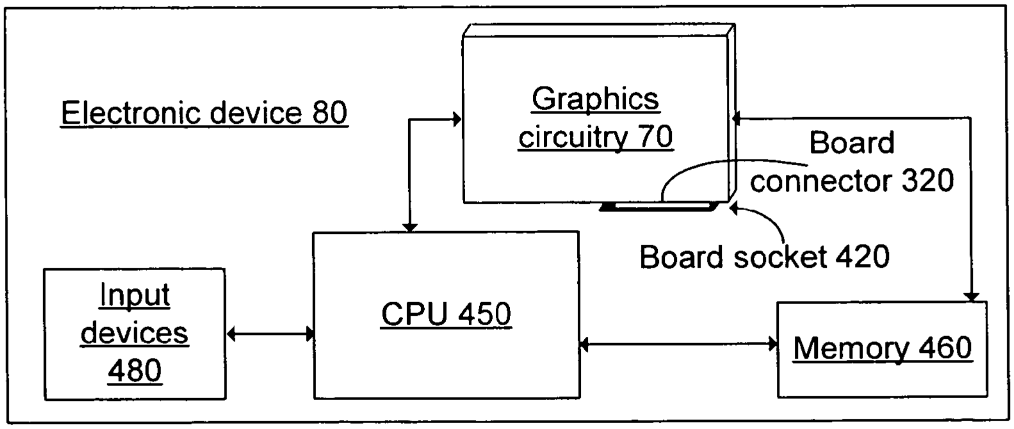
FIG. 4 is a block diagram of an electronic device consistent with an embodiment of the present invention.

The graphics processor 350 typically controls display data resolution, color depth (possibly in conjunction with the RAMDAC 340), and aspects of rendering display data 85. In particular, the graphics processor 350 may handle bitmap transfers and painting, window resizing and repositioning, line drawing, font scaling, and polygon drawing in hardware. The graphics processor 350 may function like a coprocessor or an accelerator. In the case of a coprocessor, the graphics processor 350 processes all graphics related tasks without assistance from the controller 450 of the electronic device 80 (FIG. 4). In the case of an accelerator, the graphics processor 350 processes specific graphics related tasks delegated by the controller 450 of the electronic device 80. The output of the graphics processor 350 (e.g., display data 85) is typically stored in the video memory 360 and subsequently transferred to the display 10.

As indicated above, the video memory 360 stores display data 85 (e.g., bitmaps that correspond to pixels of the screen 30) in a digital form. The video memory 360 may be formed by Video Ram ("VRAM"), Windows RAM ("WRAM"), EDO DRAM, SDRAM, SGRAM, or DRDRAM.

Specific components (not illustrated) that manipulate and monitor the state of the data signal Pin/Skt 12 and the clock signal Pin/Skt 15 of the graphic circuitry's 70 connector 220 may also include pull-up resistors, input buffers, transistors, tri-state drivers, open collector drivers, and/or other components without departing from the scope of the present invention.

Referring to FIG. 4, there is shown a block diagram of components that may be included in the electronic device 80. The electronic device 80 typically comprises a computer, but may comprise other electronic devices as well. As illustrated in FIG. 4, the electronic device 80 typically includes standard computer components such as one or more central processing units ("CPU") 450, input devices 480 (e.g., keyboard, mouse, network connections, etc.), a memory 460, and one or more board sockets 420.

The memory 208, which typically includes high speed random access memory as well as non-volatile storage such as disk storage, may store an operating system, program modules, and device drivers. The operating system includes procedures for handling various basic system services and for performing hardware dependent tasks. In particular, the operating system may provide program modules and/or devices drivers with access to the graphics circuitry 70. These program modules and/or devices drivers may, therefore, operate in conjunction with graphics card 70 (e.g., send graphics related tasks to the graphics processor 350).

As indicated above, the graphics circuitry 70 and the display 10 engage in communication that adheres to the DDC2B standard. VESA, the Video Electronics Standards Association, developed the DDC2B standard, under which the graphics circuitry 70 is the master and the display 10 is the slave. Thus, under the DDC2B standard, the display 10 responds to requests and does not make requests or otherwise initiate transactions.

By using the $I^2C$ bus protocol, which was developed by Philips and is incorporated herein by reference, the DDC2B standard enables the graphics circuitry 70 to access data stored by the display 10. In particular, the DDC2B standard and the $I^2C$ bus protocol enable the graphics circuitry 70 to issue a request (as the master) to the display 10 for data, which the display 10 subsequently transfers to the graphics circuitry 70. Previously, the graphics circuitry 70 requests such data during boot-up and configuration of the graphics circuitry 70 and/or electronic device 80. The data requested is stored in an $I^2C$ slave memory location (e.g., a location in the display memory 260). Additional transactions defined by the DDC2B standard include protocol synchronization and address offset specification.

The content and arrangement of at least some of the data stored by the display 10 and the data requested by the graphics circuitry 70 is preferably consistent with the Extended Display Identification Data ("EDID") standard. The EDID standard, at the time of this writing, has two versions that define separate data sets (e.g., EDID data sets) (both of which are incorporated herein by reference).

Of particular importance to embodiments that use an EDID version 1 data set are the 19th, 20th, and 127th bytes thereof. Bytes 19 and 20 disclose that the data set is an EDID version 1 data set. The 127th byte indicates whether additional data sets (e.g., an EDID version 2 data set) are also stored in the display memory 260 (e.g., data sets that do store orientation data). Of particular importance to embodiments that use an EDID version 2 data set are the first byte, the 4th and 5th bits of the 82nd byte, and the 4th bit of the 85th byte. The first byte discloses that the data set is an EDID version 2 data set. The 4th and 5th bits of the 82nd byte disclose the orientation of the display 10 (e.g., whether the display 10 is in a portrait orientation or a landscape orientation). Similarly, the 4th bit of the 85th byte discloses whether the orientation of the display 10 is adjustable. In other words, whether the orientation of the display 10 can be switched from landscape to portrait and vice versa (e.g., whether the present invention is applicable or not).

Moreover, the arrangement of data sets stored by the display 10 is preferably consistent with the Enhanced Extended Display Identification Data ("E-EDID"™) standard, which is incorporated herein by reference. The use of the data sets and data set arrangement described in this and the two preceding paragraphs enables embodiments of the present invention to request and receive orientation information in a manner consistent with the DDC2B standard.

As stated above, the DDC2B standard defines a number of transactions. Of particular importance to the present invention is a data transfer. A data transfer is initiated by the graphics circuitry 70 and includes the display 10 transmitting data, such as orientation data, to the graphics circuitry 70.

Figure 5A:
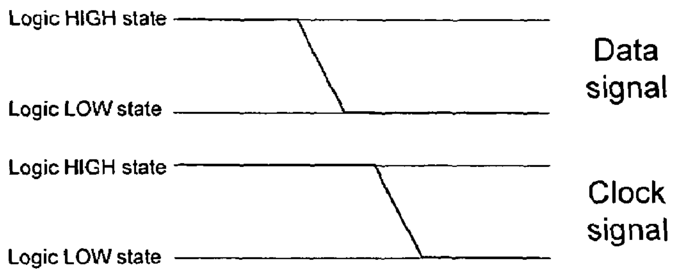
FIG. 5A illustrates a start sequence consistent with an embodiment of the present invention.
Figure 5B:
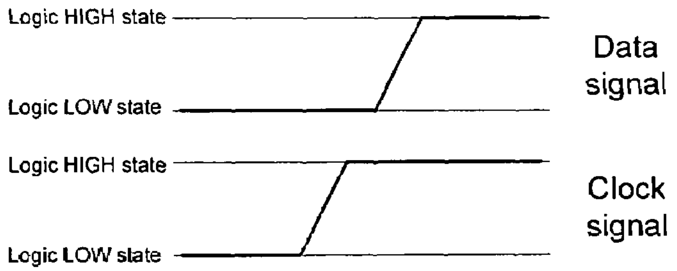
FIG. 5B illustrates a stop sequence consistent with an embodiment of the present invention.

To begin a data transfer, the graphics circuitry 70 transmits a start sequence, which indicates to the display 10 that data is about to be transmitted by the graphics circuitry 70. The graphics processor 250 typically transmits the start sequence by adjusting the data signal Pin/Skt 12 to a logic LOW state, and then adjusting the clock signal Pin/Skt 15 to a logic LOW state as illustrated in FIG. 5A (i.e., by driving a high-to-low transition on the serial data line followed by a high-to-low transition on the serial clock line). Once the start sequence is transmitted, the data signal Pin/Skt 12 and the clock signal Pin/Skt 15 are not free until the graphics circuitry 70 transmits a stop sequence. The stop sequence may be transmitted by releasing the data signal Pin/Skt 12 to a logic HIGH state, and then releasing the clock signal Pin/Skt 15 to a logic HIGH state as illustrated in FIG. 5B (i.e., by driving a low-to-high transition on the serial clock line followed by a low-to-high transition on the serial data line).

Figure 5C:
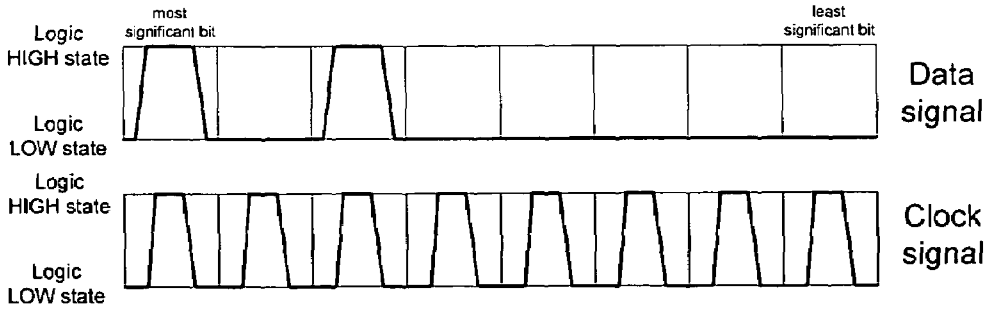
FIG. 5C illustrates a device address and read/write indicator consistent with an embodiment of the present invention.

The graphics circuitry 70 then transmits an address. The address identifies the display 10. FIG. 5C illustrates a series of data signal and clock signal transitions or states (i.e., bit values of one and zero) that comprise a transmission of the address and the read/write indicator.

As illustrated in FIG. 5C, a bit value of one is transmitted by releasing the data signal Pin/Skt 12 to a logic HIGH state and holding the data signal Pin/Skt 12 at the logic HIGH state while adjusting the clock signal Pin/Skt 15 to a logic LOW state and subsequently releasing the clock signal Pin/Skt 15 to a logic HIGH state (e.g., a bit value of one is transmitted when the data signal is high while the clock signal has a low-to-high transition followed by a high-to-low transition). Further, a bit value of zero is transmitted by adjusting the data signal Pin/Skt 12 to a logic LOW state and holding the data signal Pin/Skt 12 at the logic LOW state while adjusting the clock signal Pin/Skt 15 to a logic LOW state and subsequently releasing the clock signal Pin/Skt 15 to a logic HIGH state (e.g., a bit value of zero is transmitted when the data signal is low while the clock signal has a low-to-high transition followed by a high-to-low transition).

As also illustrated in FIG. 5C, the address is typically 50 h and the read/write indicator (i.e., the least significant bit) is 0. By setting the read/write indicator to 0, the graphics circuitry 70 indicates that it will transmit an address offset in a subsequent byte of data.

After the graphics circuitry 70 transmits the address and the read/write indicator and the display 10 acknowledges them, the graphics circuitry 70 transmits an address offset (as defined in the DDC2B specification). The address offset identifies a location of a data set (e.g., an EDID version 1 data set, an EDID version 2 data set, etc.) maintained within the display memory 260 of the display 10. Typically, the address offset is 00 h, which as indicated above may correspond to a first data set (e.g., an EDID version 1 data set) in a series of data sets maintained by the display 10. Upon receipt of the address offset, the display 10 then preferably stores this information within the display memory 260 for subsequent use. For example, the address offset may determine where the display controller 250 begins reading from the display memory 260 when responding to a subsequent request for data by the graphics circuitry 70.

After the graphics circuitry 70 transmits the address offset and the display acknowledges them, the graphics circuitry 70 transmits the device address and the read/write indicator again (as defined in the DDC2B specification). This time, the read/write indicator is set to 1 to indicate that the graphics circuitry 70 is requesting 128 bytes of data beginning at the address offset maintained by the display 10.

After the graphics circuitry 70 transmits the address and the read/write indicator and the display acknowledges them, the display 10 transmits data from the display memory 260 to the graphics circuitry 70 (as defined in the DDC2B specification). To do so, the display 10 modulates the state of the data signal Pin/Skt 12 to transmit data in a binary form (e.g., one bit at a time). The graphics circuitry 70, however, continues to control the timing of the transmission by transmitting clock signal pulses. As defined by the DDC2B standard, the display 10 does not change or modulate the data signal Pin/Skt 12 while the clock signal Pin/Skt 15 is in a logic HIGH state (doing so violates the DDC2B standard). The graphics circuitry 70 preferably samples or monitors the data signal Pin/Skt 12 while the clock signal Pin/Skt 15 is in the logic HIGH state. The graphics circuitry 70 acknowledges receipt of each byte of data. Similarly, the display 10 releases and monitors the data signal Pin/Skt 12 after transmitting each byte of data, with the exception of the last byte of data, to confirm the graphics circuitry's 70 acknowledgment. Following each acknowledgment, the display 10 transmits a subsequent byte of data. And after all of the data has been transmitted and acknowledged, the display 10 transmits a checksum, which may be used for transmission error detection. If an error occurs, the data may be requested an additional time. The graphics circuitry 70 responds to the checksum with a not acknowledge (i.e., a NACK) by allowing the data signal Pin/Skt 12 to float to a logic HIGH state and transmitting a clock signal pulse. The graphics circuitry 70 may, for example, then transmit a stop sequence or transmit another DDC2B standard command (e.g., address offset specification, data request, etc.).

Figure 6:
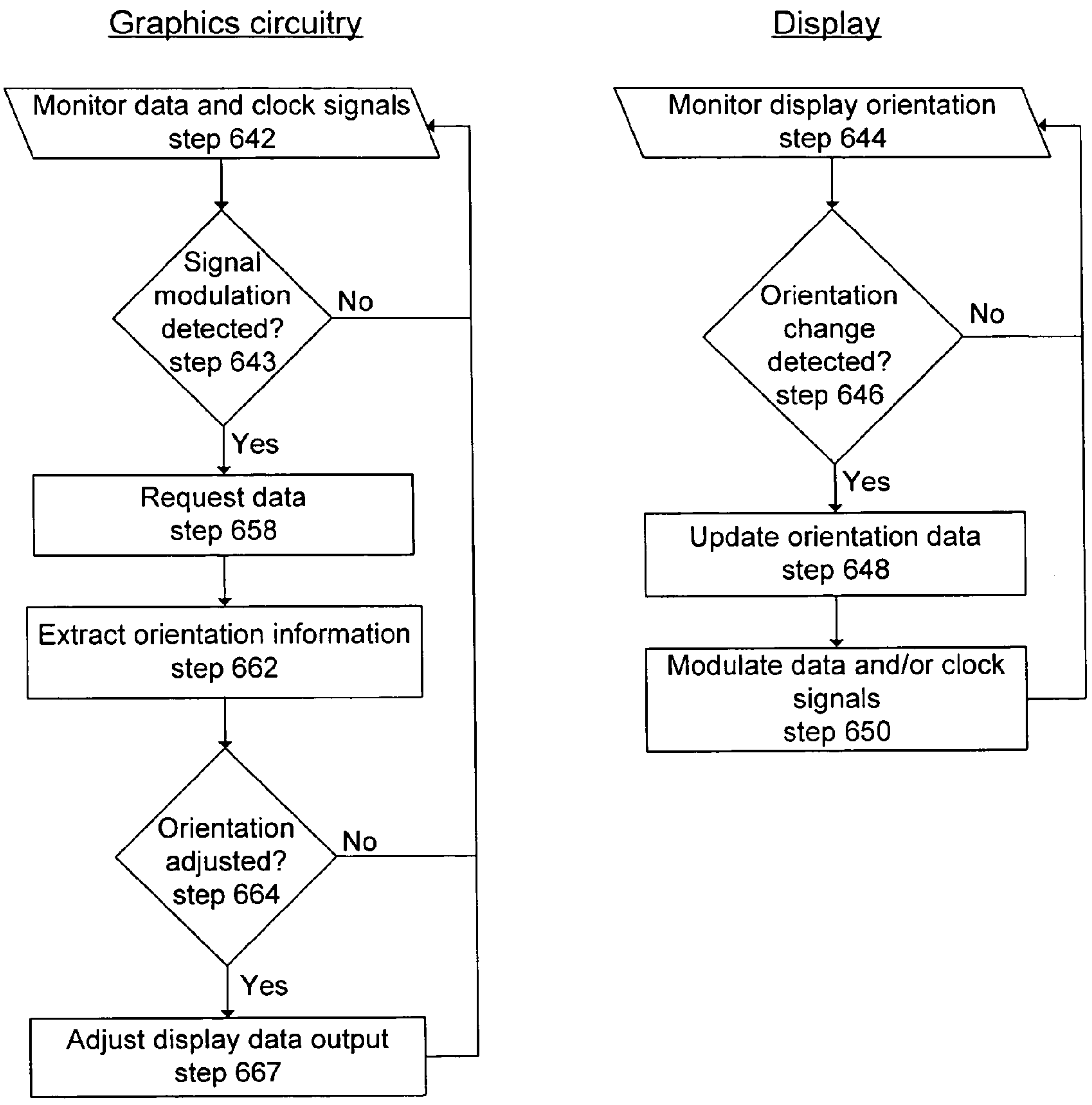
FIG. 6 illustrates a series of processing steps for detecting and responding to a display rotation that is consistent with an embodiment of the present invention.

FIG. 6 illustrate a series of steps taken by the graphics circuitry 70 and the display 10 consistent with an embodiment of the present invention. These processing steps preferably take place after the display 10 and the graphics circuitry 70 achieve protocol synchronization, which is described in detail in the DDC2B specification and is beyond the scope of the present invention. In a first step (state or series of steps) (by the graphics circuitry 70), the graphics circuitry monitors the data signal Pin/Skt 12 and the clock signal Pin/Skt 15 (step 642). As described above, the graphics circuitry 70 may include input buffers connected to the data signal Pin/Skt 12 and the clock signal Pin/Skt 15, respectively. The data signal Pin/Skt 12 and the clock signal Pin/Skt 15 should be in a logic HIGH state (due to, for example, various pull-up resistors) during periods of inactivity. The graphics circuitry 70 may monitor the data signal Pin/Skt 12 and the clock signal Pin/Skt 15 by, for example, periodically checking the value of these input buffers. The graphics circuitry 70 may also continuously monitor these signals for state transitions (i.e., signal edges).

If the graphics circuitry 70 does not detect a signal modulation (step 643—No), the graphics circuitry 70 continues to monitor the data signal Pin/Skt 12 and the clock signal Pin/Skt 15.

While the graphics circuitry 70 monitors the data signal Pin/Skt 12 and the clock signal Pin/Skt 15, the orientation detector 270 monitors the orientation of the display 10 (step 644). If the orientation detector 270 does not detect a change to the orientation of the display 10 (step 646—No), the orientation detector 270 continues to monitor the orientation of the display 10.

But if the orientation detector 270 detects a change to the orientation of the display 10 (step 646), the display controller 250 updates orientation data maintained in the display memory 260. More specifically, the display controller 250 receives orientation input from the orientation detector 270 as described above and, for example, updates the 4th and 5th bits of the 82nd byte of an EDID version 2 data set maintained in the display memory 260 to reflect the new orientation of the display 10.

The display controller 250 then modulates the data signal Pin/Skt 12 and/or the clock signal Pin/Skt 15. As described above, the display 10 is a slave device. As a result, the display 10 should not modulate the data signal Pin/Skt 12 (i.e., transmit data) unless the graphics circuitry 70 makes a requests for data or modulate the clock signal Pin/Skt 15 under any circumstances.

So if an orientation change is detected by the orientation detector 270, the display 10 may transmit a pulse over the data signal Pin/Skt 12. In other words, the display 10 may adjust the data signal Pin/Skt 12 to a logic LOW state, hold the data signal Pin/Skt 12 in this state for a defined period of time, and then allow the data signal Pin/Skt 12 to float back to a logic HIGH state. As noted above, the DDC2B standard does not permit the display 10 to adjust the data signal Pin/Skt 12 while the clock signal Pin/Skt 15 is in a logic HIGH state. The graphics circuitry 70 will detect this data pulse (as described above), and take some or all of steps 654-667, which are described in detail below. Other devices detecting this pulse will ignore it since this pulse was not requested and is not defined or allowed by the DDC2B standard (e.g., does not comprise a start sequence).

Figure 7A:
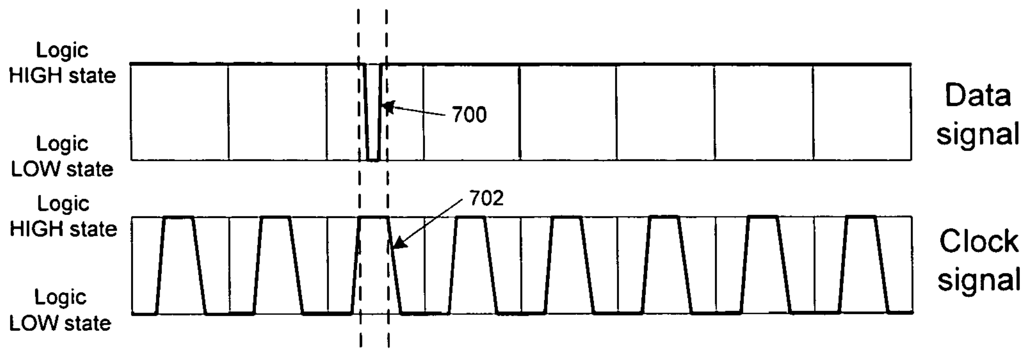
FIGS. 7A and 7B illustrate invalid/undefined control signal sequences consistent with an embodiment of the present invention.

In embodiments in which the graphics circuitry 70 continuously transmits clock signal pulses, the display 10 times modulation of the data signal Pin/Skt 12 to coincide with the clock signal Pin/Skt 15 being in a logic HIGH state, as illustrated in FIG. 7A. As shown in FIG. 7A, the modulation 700 of the data signal Pin/Skt 12 takes place while the clock signal Pin/Skt 15 is in a logic HIGH state 702 (the use of the third time slot or clock pulse is arbitrary).

Figure 7B:
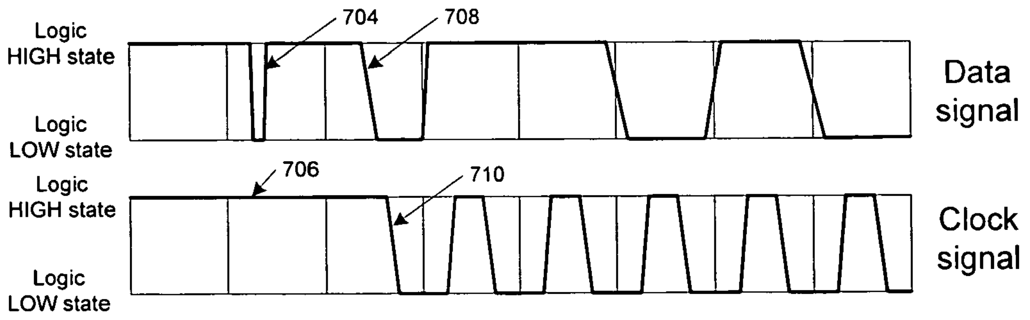

In embodiments in which the graphics circuitry 70 does not continuously transmit clock signal pulses, the display 10 modulates the data signal Pin/Skt 12 at anytime, as illustrated in FIG. 7B. As shown in FIG. 713, the modulation 704 of the data signal Pin/Skt 12 takes place while the clock signal Pin/Skt 15 is in a logic HIGH state 706. Subsequently, the graphics circuitry 70 initiates a request for data from the display 10 by transmitting a start signal, which is done by pulling data signal Pin/Skt 12 low 708, followed by pulling clock signal Pin/Skt 15 low 710, subsequently followed by transmissions according to the DDC2B standard.

In some embodiments, the modulation indicating a change in the orientation of the display 10 takes the form of an illegal pulse (or "glitch") on the data signal Pin/Skt 12, as exemplified by 700 and 704 in the figures. According to the standards incorporated above, this type of pulse is illegal, but is used by the present invention to signal an orientation change of the display 10.

In still other embodiments, the display 10 transmits a pulse over the clock signal Pin/Skt 15 if an orientation change is detected by the orientation detector 270. In other words, the display 10 may adjust the clock signal Pin/Skt 15 to a logic LOW state, hold the clock signal Pin/Skt 15 in this state for a defined period of time, and then allow the clock signal Pin/Skt 15 to float back to a logic HIGH state. The graphics circuitry 70 will detect this pulse, and take some or all of steps 654-667, which are described in detail below. As noted above, the DDC2B standard does not permit the display 10 to modulate the clock signal pulse. Other devices detecting this pulse will ignore it since this pulse was not requested and is not defined or allowed by the DDC2B standard (e.g., does not comprise a start sequence).

Other data and/or clock signals that are undefined or illegal operations under the DDC2B standard are possible and within the scope of the present invention. For example, the display 10 may transmit a start sequence, an invalid address (e.g., fewer than a prescribed number of address bits or an illegal/undefined combination of bits), and then a stop sequence. Again, the graphics circuitry 70 is the master of the data and clock signals so no activity should take place without a request from the graphics circuitry 70. The graphics circuitry 70, therefore, preferably responds to this activity as described below. But other devices detecting this activity will ignore it since an invalid address (according to the DDC2B standard) is specified.

The graphics circuitry 70 should detect the modulation of the data signal Pin/Skt 12 and/or the clock signal Pin/Skt 15 (by catching signal edges or periodic sampling of the signals) (step 643—Yes) and respond by requesting orientation data from the display 10 (step 654). As described in detail above, this typically includes transmitting a start sequence, an address offset, a request for data at the specific address, and a stop sequence. The display 10 preferably responds by acknowledging the request and serially transmitting the data as described above.

Upon receiving the data, the graphics circuitry 70 extracts the orientation information from the data set (step 662). If the extracted orientation information indicates that the orientation of the display 10 has not changed (e.g., the orientation of the display 10 is consistent with the current formatting of display data 85 transmitted by the graphics circuitry 70) (step 664—No), the graphics circuitry 70 takes no further action with respect to the signal modulation detected in step 652 and continues to monitor the data and clock signals for a signal modulation (step 642). But if the extracted orientation information indicates that the orientation of the display 10 has changed (step 664—Yes), the graphics circuitry 70 formats the display data 85 accordingly (step 667) and then continues to monitor the data and clock signals for another signal modulation (step 642).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. In the claims, the order in which steps or operations are listed does not imply any order in which the steps or operations are to be performed, unless specifically stated in the claim.

What is claimed is:

1. A system for adjusting display data orientation, said system including graphics circuitry configured to send and receive control signals over a set of control lines, said exchange governed by a communication protocol;
- the graphics circuitry configured to request orientation information via the set of control lines upon detecting a modulation of the set of control lines that is undefined by said communication protocol; and
- the graphics circuitry configured to adjust an orientation of display data by reference to the orientation information upon receiving said orientation information via the set of control lines,
- wherein the set of control lines comprises a data line and a clock line,
- wherein the modulation comprises a modulation of the data line, and
- wherein the modulation comprises modulating a data pulse having a first polarity with a narrower pulse having a second polarity.

2. The system of claim 1, wherein the modulation further comprises a modulation of the clock line.

3. The system of claim 1, wherein the modulation further comprises an adjustment of a state of the data line while the clock line is maintained in a logic HIGH state.

4. The system of claim 1, wherein the graphics circuitry comprises a graphics card.

5. The system of claim 1, wherein the graphics circuitry is housed in a computing device, said computing device generating the display data, said display data transmitted over a data line separate from the set of control lines.

6. The system of claim 5, wherein
- the set of control lines connect the graphics circuitry to a display device;
- the data line also connects the graphics circuitry so that said display device displays said display data.

7. The system of claim 6, wherein the display device comprises a cathode ray tube display.

8. The system of claim 6, wherein the display device comprises flat panel display.

9. The system of claim 1, wherein the communication protocol comprises the digital display channel standard promulgated by the video electronics standards association.

10. The system of claim 1 wherein a logic HIGH data pulse is modulated with a narrower logic LOW data pulse.

11. A system for processing orientation changes, said system including
- a display device configured to communicate over a set of control lines in accordance with a communication protocol;
- the display device configured to detect a change in an orientation of said display device; and the display device configured to initiate a modulation of the set of control lines that is undefined by said communication protocol upon detecting the change in the orientation of said display device, wherein the set of control lines comprises a data line and a clock line, wherein the modulation comprises a modulation of the data line, and wherein the modulation comprises modulating a data pulse having a first polarity with a narrower pulse having a second polarity.

12. The system of claim 11, wherein the modulation further comprises a modulation of the clock line.

13. The system of claim 11, wherein the modulation further comprises an adjustment of a state of the data line while the clock line is maintained in a logic HIGH state.

14. The system of claim 11, wherein the display device comprises a cathode ray tube display.

15. The system of claim 11, wherein the display device comprises flat panel display.

16. The system of claim 11, wherein the display device is connected via the set of control lines to graphics circuitry; and the graphics circuitry is configured to request orientation information from the display device via the set of control lines upon detecting the modulation of the set of control lines.

17. The system of claim 16, wherein the graphics circuitry is housed in a computing device, said computing device generating display data, said display data transmitted by said graphics circuitry over a data line separate from the set of control lines.

18. The system of claim 17, wherein the data line connects the graphics circuitry to the display device, said display device displays said display data.

19. The system of claim 17, wherein the graphics circuitry is configured to adjust an orientation of the display data by reference to the orientation information following receipt of said orientation information via the set of control lines.

20. The system of claim 11, wherein the communication protocol comprises the digital display channel standard promulgated by the video electronics standards association.

21. A system for processing display device orientation changes, said system includes a display device and graphics circuitry, said display device and said graphics circuitry configured to exchange control signals over a set of control lines, said exchange governed by a communication protocol;

the display device configured to detect a change in an orientation of said display device;

the display device configured to initiate a modulation of the set of control lines that is not defined by the communication protocol upon detecting said change in the orientation of said display device;

the graphics circuitry configured to request orientation information from the display device upon detecting the modulation of the set of control lines; and the graphics circuitry configured to adjust an orientation of display data transmitted to the display device by reference to the orientation information upon receiving said orientation information via the set of control lines, wherein the set of control lines comprises a data line and a clock line, wherein the modulation comprises a modulation of the data line, and wherein the modulation comprises modulating a data pulse having a first polarity with a narrower pulse having a second polarity.

22. The system of claim 21, wherein the modulation further comprises a modulation of the clock line.

23. The system of claim 21, wherein the modulation further comprises an adjustment of a state of the data line while the clock line is maintained in a logic HIGH state.

24. The system of claim 21, wherein the graphics circuitry comprises a graphics card.

25. The system of claim 21, wherein the graphics circuitry is housed in a computing device, said computing device generating the display data, said display data transmitted over a data line separate from the set of control lines.

26. The system of claim 25, wherein the data line connects the graphics circuitry to said display device.

27. The system of claim 21, wherein the display device comprises a cathode ray tube display.

28. The system of claim 21, wherein the display device comprises flat panel display.

29. The system of claim 21, wherein the communication protocol comprises the digital display channel standard promulgated by the video electronics standards association.

30. A system for adjusting data orientation, said system including graphics circuitry configured to send and receive control signals over a set of control lines, said exchange governed by a master/slave communication protocol under which said graphics circuitry is a lone master of said set of control lines;

the graphics circuitry configured to request orientation information via the set of control lines upon detecting a modulation of the set of control lines that is undefined by said master/slave communication protocol and not initiated by said graphics circuitry; and the graphics circuitry configured to adjust an orientation of display data by reference to the orientation information upon receiving of said orientation information via the set of control lines, wherein the set of control lines comprises a data line, and wherein the modulation comprises modulating a data pulse on the data line, the data pulse having a first polarity with a narrower pulse having a second polarity.

31. A system for processing orientation changes, said system including a display device configured to receive control signals over a set of control lines in accordance with a master/slave communication protocol under which said display device is a slave;

the display device configured to detect a change in an orientation of said display device; and the display device configured to initiate a modulation of the set of control lines in violation of master/slave communication protocol upon detecting the change in the orientation of said display device, wherein the set of control lines comprises a data line, and wherein the modulation comprises modulating a data pulse on the data line, the data pulse having a first polarity with a narrower pulse having a second polarity.

32. A system for processing display device orientation changes, said system includes a display device and graphics circuitry, said display device and said graphics circuitry configured to exchange control signals over a set of control lines, said exchange governed by a master/slave communication protocol under which said graphics circuitry is a lone master of said set of control lines and said display device is a slave of said set of control lines;

the display device configured to detect a change in an orientation of said display device;

the display device configured to initiate a modulation of the set of control lines in violation of said master/slave communication protocol upon detecting said change in the orientation of said display device;

the graphics circuitry configured to request orientation information from the display device upon detecting the modulation of the set of control lines; and the graphics circuitry configured to adjust an orientation of display data transmitted to the display device by reference to the orientation information following receipt of said orientation information via the set of control lines, wherein the set of control lines comprises a data line, and wherein the modulation comprises modulating a data pulse on the data line, the data pulse having a first polarity with a narrower pulse having a second polarity.

33. A system for adjusting display data orientation, said system including graphics circuitry configured to send and receive control signals over a set of control lines, said exchange governed by a communication protocol;

the graphics circuitry configured to request orientation information via the set of control lines upon detecting a modulation of the set of control lines that is defined as an illegal operation by said communication protocol; and the graphics circuitry configured to adjust an orientation of display data by reference to the orientation information upon receiving said orientation information via the set of control lines, wherein the set of control lines comprises a data line, and wherein the modulation comprises modulating a data pulse on the data line, the data pulse having a first polarity with a narrower pulse having a second polarity.

34. A system for processing orientation changes, said system including a display device configured to communicate over a set of control lines in accordance with a communication protocol;

the display device configured to detect a change in an orientation of said display device; and the display device configured to initiate a modulation of the set of control lines that is defined as an illegal operation by said communication protocol upon detecting the change in the orientation of said display device, wherein the set of control lines comprises a data line, and wherein the modulation comprises modulating a data pulse on the data line, the data pulse having a first polarity with a narrower pulse having a second polarity.

35. A system for processing display device orientation changes, said system includes a display device and graphics circuitry, said display device and said graphics circuitry configured to exchange control signals over a set of control lines, said exchange governed by a communication protocol;

the display device configured to detect a change in an orientation of said display device;

the display device configured to initiate a modulation of the set of control lines that is defined as an illegal operation by the communication protocol upon detecting said change in the orientation of said display device;

the graphics circuitry configured to request orientation information from the display device upon detecting the modulation of the set of control lines; and the graphics circuitry configured to adjust an orientation of display data transmitted to the display device by reference to the orientation information upon receiving said orientation information via the set of control lines, wherein the set of control lines comprises a data line, and wherein the modulation comprises modulating a data pulse on the data line, the data pulse having a first polarity with a narrower pulse having a second polarity.

* * * * *